US008607180B2

(12) United States Patent
Soni (10) Patent No.: US 8,607,180 B2
(45) Date of Patent: Dec. 10, 2013

(54) MULTI-PASS ROUTING TO REDUCE CROSSTALK

(75) Inventor: Anuj Soni, Bangalore (IN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/467,696

(22) Filed: May 9, 2012

(65) Prior Publication Data
US 2013/0305203 A1 Nov. 14, 2013

(51) Int. Cl.
G06F 17/50 (2006.01)

(52) U.S. Cl.
USPC ........... 716/115; 716/126; 716/129; 716/130; 716/131

(58) Field of Classification Search
USPC .......................................... 716/115, 126–131
See application file for complete search history.

(56) References Cited

U.S. PATENT DOCUMENTS

| | | | |
|---|---|---|---|
| 6,510,545 B1 * | 1/2003 | Yee et al. ................. | 716/126 |
| 6,734,472 B2 | 5/2004 | Ho | |
| 7,325,217 B2 | 1/2008 | Yoda | |
| 7,340,710 B1 * | 3/2008 | Hoerold et al. ............ | 716/113 |
| 7,519,927 B1 * | 4/2009 | Hryckowian et al. ....... | 716/100 |
| 7,802,208 B1 * | 9/2010 | Waller et al. .............. | 716/115 |
| 7,913,212 B2 * | 3/2011 | Ushiyama et al. .......... | 716/113 |
| 8,074,197 B2 | 12/2011 | McElvain et al. | |
| 8,166,443 B2 * | 4/2012 | Aoki et al. ................ | 716/129 |
| 2003/0126564 A1 * | 7/2003 | Elzinga ..................... | 716/2 |
| 2004/0049757 A1 * | 3/2004 | Vidhani ..................... | 716/12 |
| 2005/0097498 A1 * | 5/2005 | Yoda ........................ | 716/14 |
| 2005/0268264 A1 * | 12/2005 | Nagai ....................... | 716/6 |
| 2006/0195810 A1 * | 8/2006 | Morton ..................... | 716/14 |
| 2008/0184179 A1 * | 7/2008 | Ito .......................... | 716/5 |
| 2008/0184186 A1 * | 7/2008 | Belaidi et al. ............. | 716/13 |
| 2008/0244496 A1 * | 10/2008 | Sawano .................... | 716/13 |
| 2008/0276213 A1 * | 11/2008 | Aoki et al. ................ | 716/13 |
| 2008/0301610 A1 * | 12/2008 | Ushiyama et al. .......... | 716/8 |
| 2010/0079168 A1 | 4/2010 | Tashiro | |
| 2012/0204139 A1 * | 8/2012 | Suaya et al. ............... | 716/115 |
| 2012/0254816 A1 * | 10/2012 | Brink et al. ............... | 716/115 |

OTHER PUBLICATIONS

Prashant Saxena and Satyanarayan Gupta, On Integrating Power and Signal Routing for Shield Count Minimization in Congested Regions, IEEE Transactions on Computer-Aided Design of Integrated Circuits and Systems, vol. 22, No. 4, Apr. 2003.
Tong Gao and C. L. Liu, Minimum Crosstalk Channel Routing, Department of Computer Science, University of Illinois at Urbana-Champaign, Urbana, Illinois, 61801.
Siwas Chandhrasri and Wichian Sirisaengtaksin, Minimum Crosstalk Channel Routing, EE680, Spring 2002.
Tianpai Zhang, Routing Issues in Nonometer-scale Integrated Circuits, University of Minnesota, Sep. 2006.

* cited by examiner

*Primary Examiner* — Nha Nguyen
(74) *Attorney, Agent, or Firm* — Alexander J. Neudeck; Cochran Freund & Young LLC (57) ABSTRACT

An integrated circuit (IC) or a block of an IC is routed. The signals of the netlist to be routed are grouped according the signal properties. A signal property may be the time or clock used to initiate the switching of the signal. The signals of each group are routed successively. This causes the signals of later groups to be routed between the signals of previous groups thereby providing shielding between signals lines of the same group.

16 Claims, 7 Drawing Sheets

MULTI-PASS ROUTING TO REDUCE CROSSTALK

BACKGROUND OF THE INVENTION

As integrated circuit fabrication advances, interconnect wires, devices, cells, and blocks are being placed closer together. These advances allow circuits to operate at higher frequencies. Crosstalk between two wires for a given length of adjacent wires is typically proportional to the coupling capacitance between the wires, which is, in turn, inversely proportional to their separating distance. The crosstalk between two wires also depends on the switching frequency of the signals traveling in the wires. Crosstalk may produce noise which can lead to unexpected circuit behavior and switching speed reduction.

SUMMARY OF THE INVENTION

An embodiment of the invention may therefore comprise a method of routing a block of an integrated circuit, comprising: grouping a first plurality of signals into at least a second plurality of signals and a third plurality of signals based on a switching property of each of said first plurality of signals; routing said second plurality of signals using a routing algorithm that reduces crosstalk between each of said first plurality of signals by increasing a spacing between routed signal lines; and, after routing said second plurality of signal lines, routing said third plurality of signals in said spacing between routed signal lines thereby providing shielding between at least two of said second plurality of signals.

An embodiment of the invention may therefore further comprise a method of routing a block of an integrated circuit, comprising: creating a plurality of routing groups, the plurality of routing groups each having a different switching property; routing a first group of the plurality of routing groups using a router that reduces crosstalk between routed signal lines of said first group by increasing a spacing between routed signal lines of said first group; routing a second group of the plurality of routing groups using the spacing between routed signal lines of said first group thereby providing shielding between at least two of said routed signal lines of said first group.

DETAILED DESCRIPTION OF THE EMBODIMENTS

Figure 1:
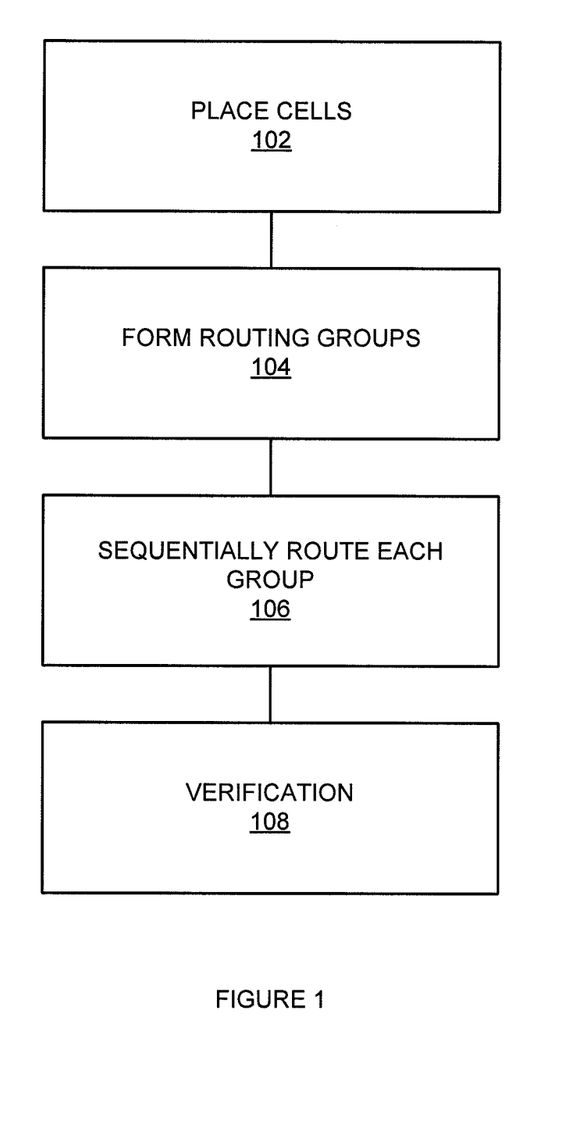
FIG. 1 is a flowchart of a multi-pass method of routing an integrated circuit.

FIG. 1 is a flowchart of a multi-pass method of routing an integrated circuit. The method illustrated in FIG. 1 may be performed by a computer running integrated circuit (IC) design software that includes, for example, IC routing software. Cells are placed (102). For example, in a typical place-and-route computer aided design (CAD) system, the circuit cells to be routed are placed.

Routing groups are formed (104). For example, signals to be routed may be grouped according to their switching properties. The signals and their interconnection (i.e., network or "nets") may be specified in a computer stored file called a netlist. Nets from the netlist may be grouped by extracting them from the netlist which specifies the whole integrated circuit (or a block thereof) to create a routing group netlist. This routing group netlist may specify only those nets for the signals in the routing group. The routing groups may, for example, be formed by grouping those nets whose signals switch during a functional mode(s) of operation into a first group(s) and those nets whose signals only relate to a test mode into a second group.

Each group is sequentially routed (106). In other words, the nets of a first group are routed first, and the nets for the other groups are not routed (or taken into consideration by the IC routing program). This will typically lead the IC routing program to maximize the spacing between each net it routes in order to minimize the crosstalk between the signals it is routing. This maximized spacing may leave at least one routing track (i.e., enough space to route another net) between two of the signal lines in the first group (wherever possible). The nets of the next group are routed. Since the first group has already been routed, the nets of the second group can be routed between two nets of the first group. This provides shielding between two signal lines of the nets in the first group. After all of the groups are routed, the design may be verified (108).

It should be understood from the foregoing that the method illustrated in FIG. 1 exploits the properties of the nets (to be routed) to minimize cross talk. During routing, nets of different groups will tend to be routed with less (or minimum) spacing than nets in the same group. For example, an IC design may have two signal properties which are, for the sake of this explanation, called functional and test. When the nets of the functional group are active, the nets in the test group are tied to a constant value. Thus, because the test group nets tend to be routed between functional group nets, the dynamic noise caused by crosstalk between signal lines in the functional group is reduced by the shielding effect of the test group nets routed between them.

It should also be understood that the foregoing process may be repeated. In other words, the foregoing process may be extended to a multi-pass approach whereby after a first (or second, or third, etc.) routing of all the groups, new groups may be formed and routed according to their signal properties. These signal properties may or may not be affected by the previous routes and/or groupings.

Figure 2A:
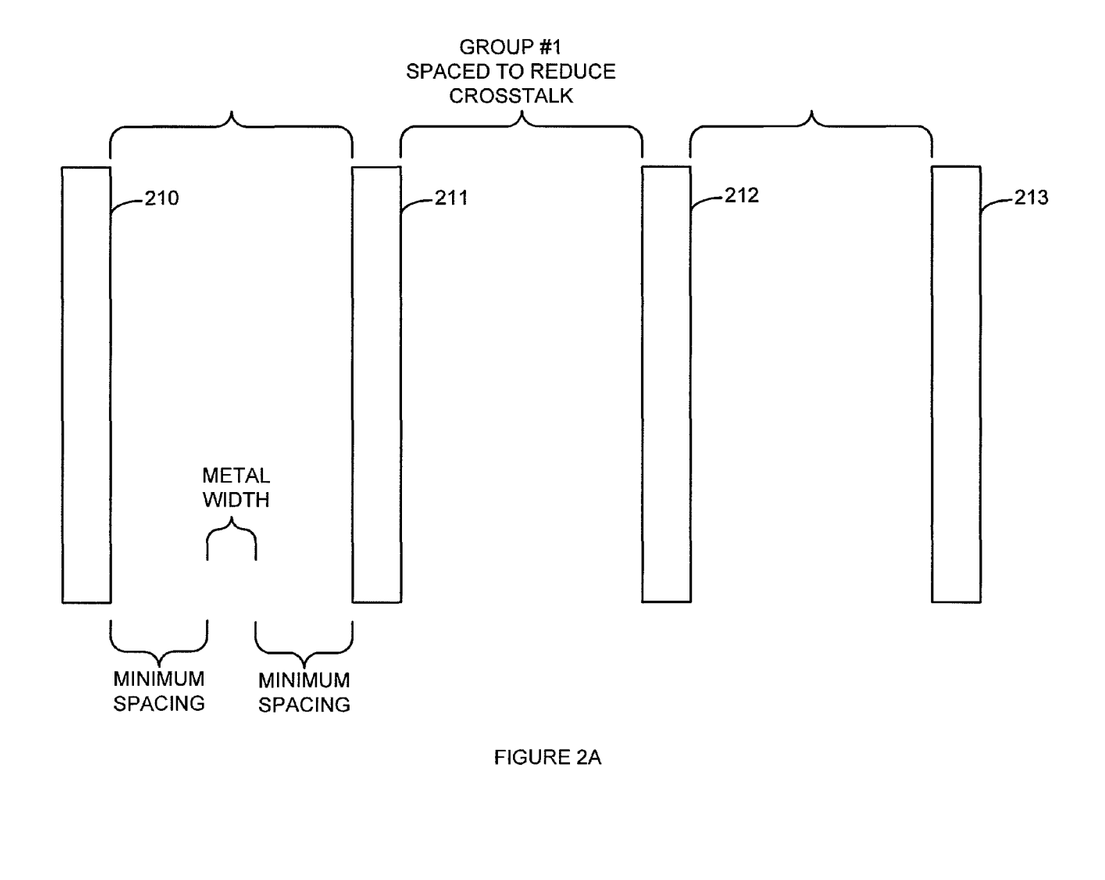
FIGS. 2A-2C are illustrations of routing groups being successively routed.
Figure 2B:
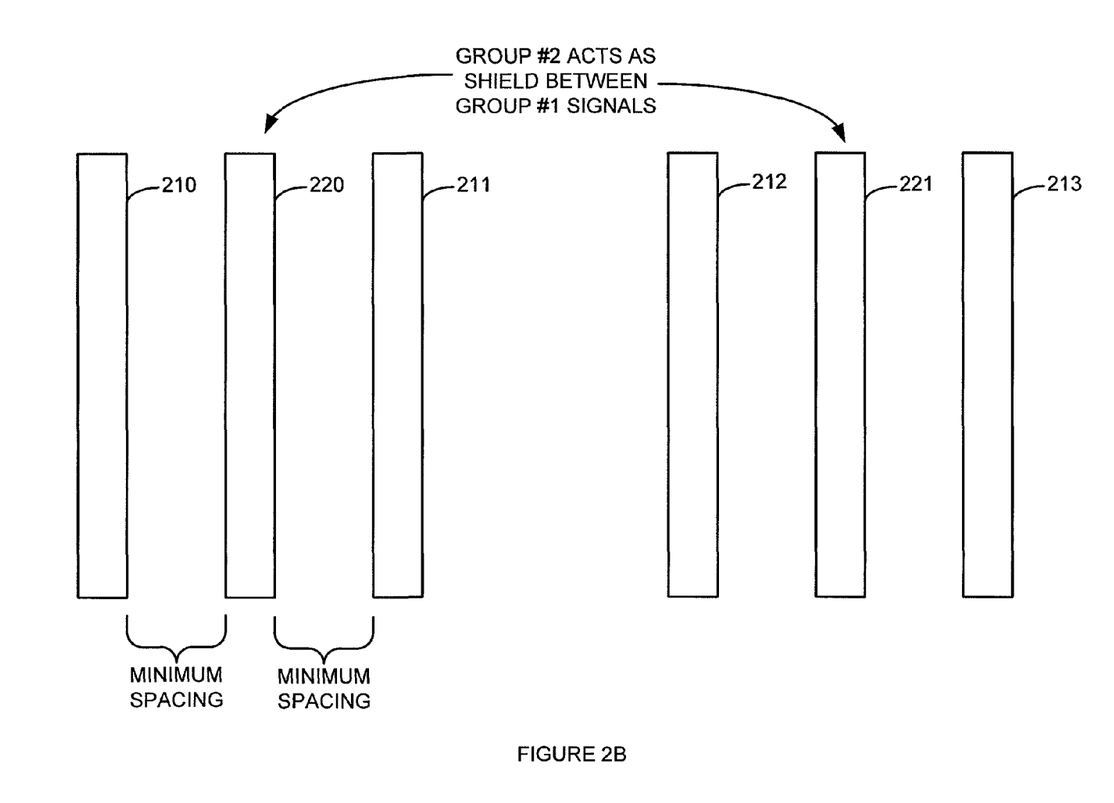
Figure 2C:
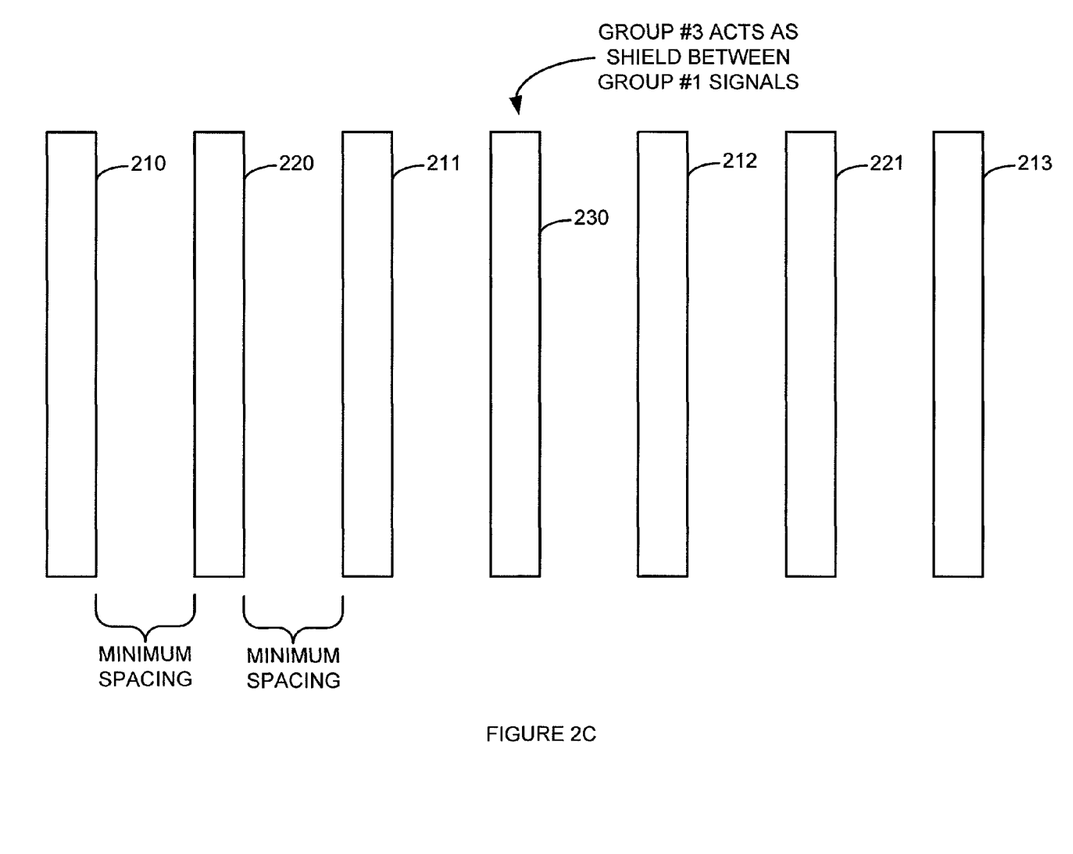

FIGS. 2A-2C are illustrations of routing groups being successively routed. The routing illustrated in FIGS. 2A-2C may result from the steps illustrated in FIG. 1. FIG. 2A illustrates several signal lines 210-213 of a first group that have been routed, but before any other groups have been routed. In other words, FIG. 2A illustrates signals lines 210-213 of a first group that have been spaced by the IC routing program to reduce crosstalk. This spacing is illustrated in FIG. 2A by the spacing between the first group's signal lines 210-213 which is two minimum line spacings and a minimum metal width (i.e., at least one routing track). Other spacings by the IC routing program which allow for multiple routing tracks between signal lines 210-213 of the first group are possible. Likewise, if the nets of the first signal group become somewhat congested, spacings between signal lines 210-213 of the first group may not be large enough for a routing track in certain areas of the route.

FIG. 2B illustrates several signal lines 220-221 of a second group that have been routed, but before a third group has been routed. As can be seen in FIG. 2B, the IC routing program has routed signal line 220 of the second group between signal lines 210 and 211 of the first group. The IC routing program has also routed signal line 221 of the second group between signal lines 212 and 213 of the first group. Thus, signal line 220 of the second group provides shielding between signal lines 210 and 211 of the first group, thereby reducing the crosstalk that signal lines 210 and 211 would experience if they had been routed next to each other with minimum spacing. Likewise, signal line 221 of the second group provides shielding between signal lines 212 and 213 of the first group, thereby reducing the crosstalk that signal lines 212 and 213 would experience if they had been routed next to each other with minimum spacing.

FIG. 2C illustrates signal line 230 of a third group that has been routed. Signal line 230 occupies the last routing track shown in FIGS. 2A-2C thereby illustrating a fully congested section of a routed IC can be seen in FIG. 2C, the IC routing program has routed signal line 230 of the third group between signal lines 211 and 212 of the first group. Thus, signal line 230 of the third group provides shielding between signal lines 211 and 212 of the first group, thereby reducing the crosstalk that signal lines 211 and 212 would experience if they had been routed next to each other with minimum spacing.

Figure 3:
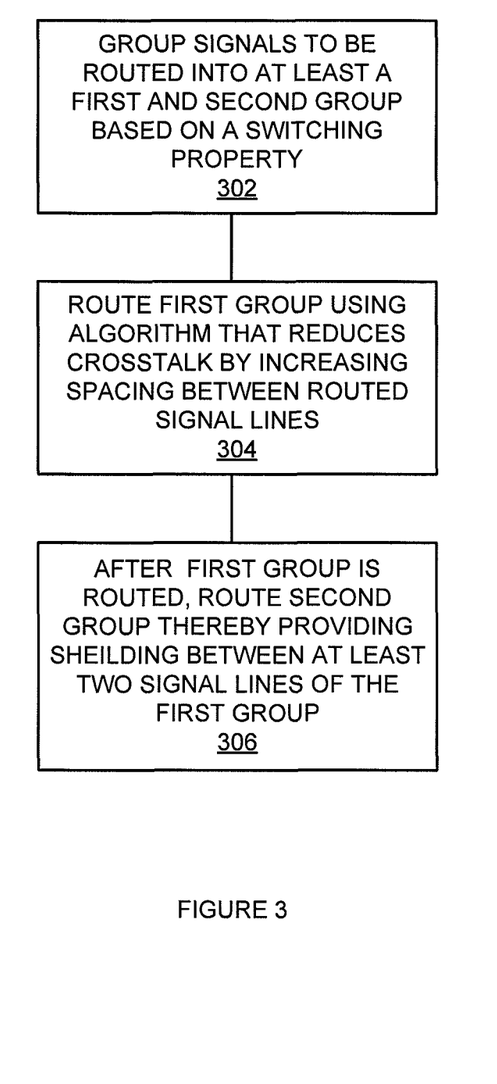
FIG. 3 is a flowchart of a method of routing for decreased crosstalk.

FIG. 3 is a flowchart of a method of routing for decreased crosstalk. The steps illustrated in FIG. 3 may result in the routes illustrated by FIGS. 2A-2C. Signals are grouped into at least a first and second group based on a switching property (302). For example, signals in a netlist may be grouped by a switching property such as "functional" or "test." In another example, signals in a netlist may be grouped according to the time reference they switch in response to. In other words, signals that switch in response to a first clock (e.g., CK1) may be grouped into a first group, and signals that switch in response to a second clock (e.g., CK2) may be grouped into a second group.

The first group is routed using an algorithm that reduces crosstalk by increasing spacing between routed signal lines (304). For example, an IC router program may attempt to minimize crosstalk when routing the signals of the first group by, whenever possible, maximizing the distance (e.g., routing tracks) between each of the signals of the first group. FIG. 2A is illustrative of a section of a route with this property.

After the first group is routed, the second group is routed thereby providing shielding between at least two signal lines of the first group (306). For example, because the first group was already routed in block 304, an IC router program may use routing tracks between signal lines of a first group to route the nets of the second group thereby reducing the crosstalk that the signal lines of the first group would experience if they had been routed next to each other with minimum spacing. FIG. 2B is illustrative of a section of a route with this property.

Figure 4:
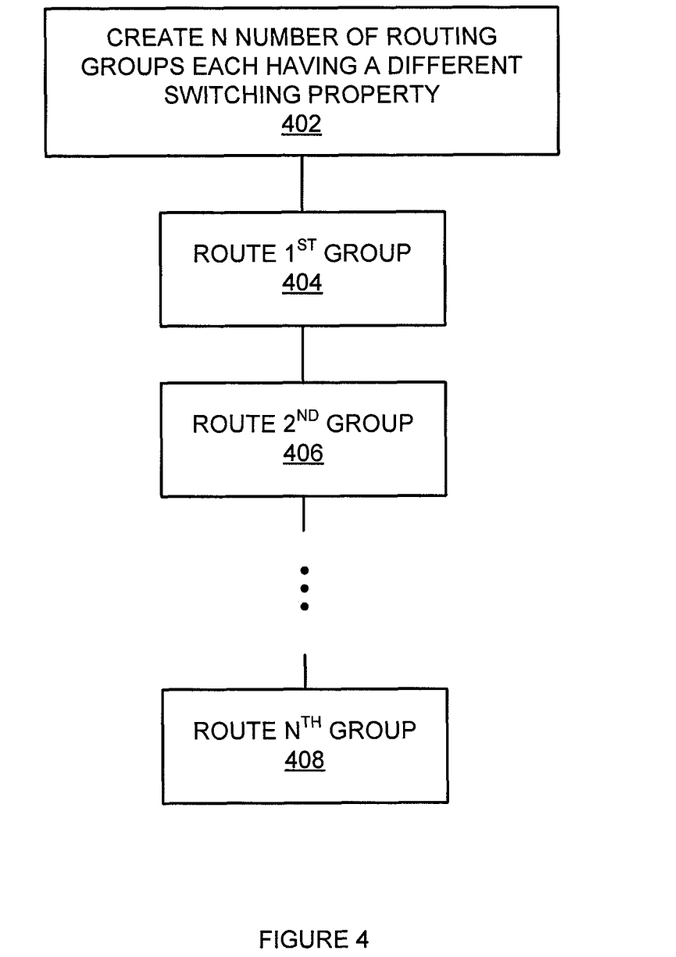
FIG. 4 is a flowchart of a method of routing to decrease crosstalk.

FIG. 4 is a flowchart of a method of routing to decrease crosstalk. The steps illustrated in FIG. 4 may result in the routes illustrated by FIGS. 2A-2C. N number of routing groups are created each having a different switching property (402). For example, signals in a netlist may be grouped into routing groups by a switching property such as "functional" or "test." In another example, signals in a netlist may be grouped into a routing group according to the time reference they switch in response to. In other words, signals that switch in response to a first clock (e.g., CK1) may be grouped into a first group, and signals that switch in response to a second clock (e.g., CK2) may be grouped into a second group, and so on, for N number of clocks or other timing references.

The first routing group is routed (404). The first group may be routed using an algorithm that reduces crosstalk by increasing spacing between routed signal lines in the group that it is currently routing. For example, an IC router program may attempt to minimize crosstalk when routing the signals of a routing group by, whenever possible, maximizing the distance (e.g., routing tracks) between each of the signals of the routing group. FIG. 2A is illustrative of a section of a route with this property.

The second group is routed (406). The second group may be routed between signal lines of the first routing group. For example, an IC router program may use routing tracks between signal lines of a previous routing group(s) to route the nets of the second group thereby reducing the crosstalk that the signal lines of the previous group(s) would experience if they had been routed next to each other with minimum spacing. FIG. 2B is illustrative of a section of a route with this property. Each group is then routed successively until the Nth routing group is routed (408).

The systems described above may be implemented with or executed by one or more computer systems. The methods described above may also be stored on a computer readable medium. Many of the elements of a computer, other electronic system, or integrated circuit may be created using the methods described above.

Figure 5:
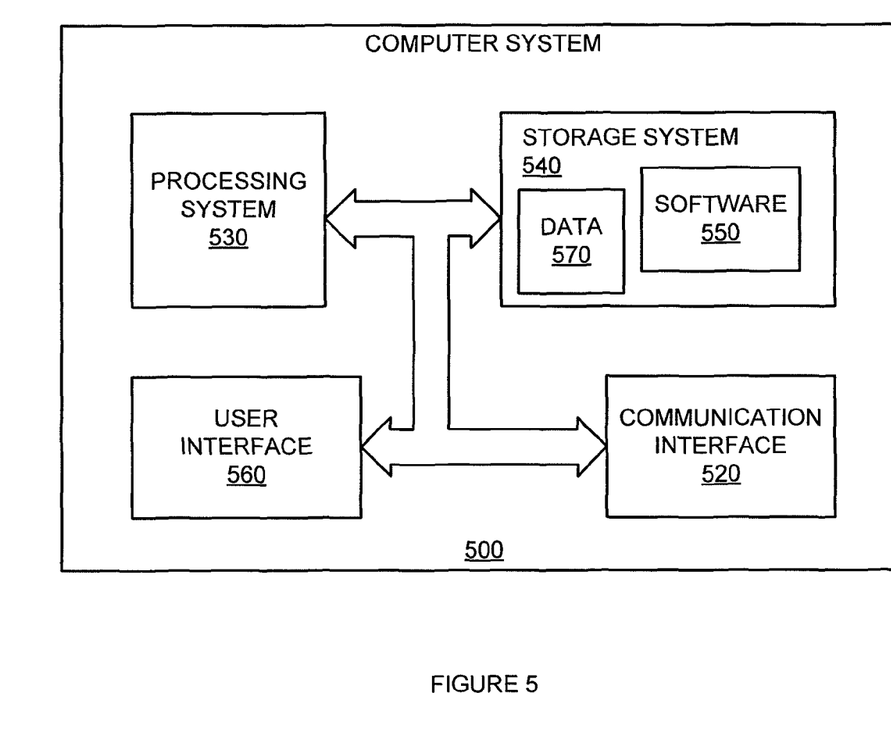
FIG. 5 is a block diagram of a computer system.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 530 may create or modify software 550 or data 570 to achieve a tangible result. Processing system 530 may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of routing a block of an integrated circuit, comprising:
   grouping a first plurality of signals into at least a second plurality of signals and a third plurality of signals based on a switching property of each of said first plurality of signals, said switching property based on switching activity that varies according to a mode said integrated circuit is operating;
   routing, by using at least one computer, said second plurality of signals and not routing said third plurality of signals using a routing algorithm that reduces crosstalk between each of said first plurality of signals by increasing a spacing between routed signal lines to spacing that is greater than a minimum spacing for signals routed next to each other; and,
   after routing said second plurality of signal lines and not routing said third plurality of signals, routing, by using at least one computer, said third plurality of signals in said spacing between routed signal lines thereby providing shielding between at least two of said second plurality of signals.

2. The method of claim 1, wherein said switching property is a functional mode of operation.

3. The method of claim 2, wherein said functional mode of operation includes a test mode.

4. The method of claim 1, wherein said second plurality of signals all switch based on a first time reference and said third plurality of signals switch based on a second time reference, the first time reference and the second time reference not switching at the same time.

5. The method of claim 1, wherein said switching property is that said third plurality of signals are static while said second plurality of signals are switching.

6. The method of claim 1, further comprising:
   after routing said third plurality of signal lines, repeating routing said second plurality of signals and not routing said third plurality of signals; and,
   after, repeating routing said second plurality of signals, repeating routing said third plurality of signals.

7. A method of routing a block of an integrated circuit, comprising:
   creating a plurality of routing groups, the plurality of routing groups each having a different switching property, said switching property based on switching activity that varies according to a mode said integrated circuit is operating;
   routing, by using at least one computer, a first group of the plurality of routing groups and not routing a second group of the plurality of routing groups using a computer executed router algorithm that reduces crosstalk between routed signal lines of said first group by increasing a spacing between routed signal lines of said first to spacing that is greater than a minimum spacing for signals routed next to each other; and,
   after routing the first group of the plurality of routing groups and not routing the second group of the plurality of routing groups routing, by using at least one computer executing a router algorithm, the second group of the plurality of routing groups using the spacing between routed signal lines of said first group thereby providing shielding between at least two of said routed signal lines of said first group.

8. The method of claim 7, wherein said different switching property is a functional mode of operation.

9. The method of claim 8, wherein said functional mode of operation includes a test mode.

10. The method of claim 7, wherein said grouping said first group all switch based on a first time reference and said second group switch based on a second time reference, the first time reference and the second time reference not switching at the same time.

11. The method of claim 7, wherein each group of the plurality of routing groups switches when the other groups of the plurality of routing groups is static.

12. A non-transitory computer readable medium having instructions stored thereon for routing a block of an integrated circuit that, when executed by a computer, at least instruct the computer to:
   group a first plurality of signals into at least a second plurality of signals and a third plurality of signals based on a switching property of each of said first plurality of signals, said switching property based on switching activity that varies according to a mode said integrated circuit is operating;
   route said second plurality of signals and not routing said third plurality of signals using a routing algorithm that reduces crosstalk between each of said first plurality of signals by increasing a spacing between routed signal to spacing that is greater than a minimum spacing for signals routed next to each other;
   after routing said second plurality of signal lines and not routing said third plurality of signals, route said third plurality of signals in said spacing between routed signal lines thereby providing shielding between at least two of said second plurality of signals.

13. The non-transitory computer readable medium of claim 12, wherein said switching property is a functional mode of operation.

14. The non-transitory computer readable medium of claim 13, wherein said functional mode of operation includes a test mode.

15. The non-transitory computer readable medium of claim 12, wherein said second plurality of signals all switch based on a first time reference and said third plurality of signals switch based on a second time reference, the first time reference and the second time reference not switching at the same time.

16. The non-transitory computer readable medium of claim 12, wherein said switching property is that said third plurality of signals are static while said second plurality of signals are switching.

* * * * *

UNITED STATES PATENT AND TRADEMARK OFFICE
CERTIFICATE OF CORRECTION

| | |
|---|---|
| PATENT NO. | : 8,607,180 B2 |
| APPLICATION NO. | : 13/467696 |
| DATED | : December 10, 2013 |
| INVENTOR(S) | : Soni |

It is certified that error appears in the above-identified patent and that said Letters Patent is hereby corrected as shown below:

In the Claims

Column 6 Lines 6-8 in Claim 7, replace "increasing a spacing between routed signal lines of said first to spacing that is greater than a minimum spacing for signals routed next to each other; and,"
With --increasing a spacing between routed signal lines of said first group to spacing that is greater than a minimum spacing for signals routed next to each other; and,--.

Signed and Sealed this
Eleventh Day of October, 2022

Katherine Kelly Vidal
*Director of the United States Patent and Trademark Office*